United States Patent
Nakajima et al.

(10) Patent No.: US 6,632,857 B1
(45) Date of Patent: Oct. 14, 2003

(54) FRICTION MATERIAL

(75) Inventors: Osamu Nakajima, Tokyo (JP); Akihiro Hikichi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/543,573

(22) Filed: Apr. 5, 2000

(30) Foreign Application Priority Data

Apr. 6, 1999 (JP) .......................................... 11-099098

(51) Int. Cl.[7] .................................................. C08J 5/14
(52) U.S. Cl. ....................... 523/149; 524/155; 524/156
(58) Field of Search ................................. 523/149, 150, 523/153, 155, 156, 157, 158; 188/251 A, 251 R

(56) References Cited

U.S. PATENT DOCUMENTS

| 4,369,263 | A | * | 1/1983 | Matsushima et al. | ....... 523/152 |
|---|---|---|---|---|---|
| 5,339,931 | A | * | 8/1994 | Jacko et al. | ................. 188/521 |
| 5,495,922 | A | * | 3/1996 | Booher | ........................ 188/251 |
| 5,516,816 | A | * | 5/1996 | Samuels | ...................... 523/149 |
| 5,576,369 | A | | 11/1996 | Kudo et al. | |
| 6,260,674 | B1 | * | 7/2001 | Arai | ........................... 188/251 |

FOREIGN PATENT DOCUMENTS

| JP | 54080351 A | * | 6/1979 |
| JP | 90056390 B | * | 2/1982 |
| JP | 11-106523 | | 4/1999 |
| WO | WO 95/07418 | | 3/1995 |
| WO | WO 97/38236 | | 10/1997 |

* cited by examiner

Primary Examiner—Edward J. Cain
Assistant Examiner—Katarzyna Wyrozebski Lee
(74) Attorney, Agent, or Firm—Finnegan, Henderson, Farabow, Garrett & Dunner LLP

(57) ABSTRACT

A friction material comprising a fibrous reinforcement, a friction modifier, and a binder. An abrasive component of the friction material includes non-fibrous particulate matters having the same material as fibrous matters of rock wool, slag wool, and ceramics including $Al_2O_3$—$SiO_2$ as a main component, but the fibrous matters are not contained.

7 Claims, 1 Drawing Sheet

FRICTION MATERIAL

BACKGROUND OF THE INVENTION

1. Field of the Invention

The present invention relates to a friction material, particularly relates to a friction material for use in an industrial machine, a railway vehicle, a baggage car, a passenger car, or the like, and more particularly relates to a friction material in a brake pad, a brake lining, a clutch facing, or the like, for use in the above-mentioned applications.

2. Description of the Related Art

In a friction material to be used mainly in a brake pad or the like, a fibrous reinforcement is used as one of materials for enhancing the strength of the friction material. Fibrous reinforcements used in place of asbestos fiber include rock wool, slag wool, $Al_2O_3$—$SiO_2$-type ceramics fiber, which includes $Al_2O_3$—$SiO_2$ as a main component, glass fiber, steel fiber, Aramid fiber, potassium titanate fiber, etc. Since these fibrous reinforcements have their own properties, a mixture of several kinds of them is used.

Among these fibrous reinforcements, rock wool using a natural ore as the raw material, slag wool using slag in steelmaking as the raw material and having the same composition as rock wool, and $Al_2O_3$—$SiO_2$-type ceramics fiber are rated highly, as abrasive hard inorganic fiber, in the point that not only can they improve the strength, the heat resistance and the abrasion resistance of the friction material as a whole, but also they can enhance a friction coefficient of the friction material through their abrasive properties, and particularly they can ensure a high friction coefficient at the time of a high load such as high-speed braking or the like.

Rock wool, slag wool and $Al_2O_3$—$SiO_2$-type ceramics fiber which have been used in place of asbestos fiber are low in price and easily available. However, since they have a fibrous form, their use tends to be regulated on working-environmental hygiene.

SUMMARY OF THE INVENTION

It is an object of the present invention to provide a friction material in such a manner that, when inorganic fiber is used as fibrous reinforcements, any fibrous reinforcements of rock wool, slag wool and $Al_2O_3$—$SiO_2$-type ceramics which have a tendency that the use of them may be regulated in future are not used, nevertheless a friction effect equal to that in the case of using those fibrous reinforcements can be provided.

In order to solve the foregoing problem, the present inventors carried out various researches about materials and forms of inorganic substances using no fibrous reinforcements of rock wool, slag wool and $Al_2O_3$—$SiO_2$-type ceramics having a tendency to be regulated in use, but nevertheless giving a friction material a friction effect equal to that in the case of using those fibrous reinforcements. As a result, the inventors found that the fibrous form of the fibrous reinforcements of rock wool, slag wool and $Al_2O_3$—$SiO_2$-type ceramics was a primary factor in their problem on working-environmental hygiene.

The present invention was attained taking it into consideration that, when rock wool, slag wool and $Al_2O_3$—$SiO_2$-type ceramics were used in particulate forms, it was possible to obtain a friction effect equal to that in the case using them as fibrous reinforcements.

That is, the present invention solved the foregoing problem as described below.

There is provided a friction material composed of a fibrous reinforcement, a friction modifier and a binder, wherein fibrous reinforcements of rock wool, slag wool and $Al_2O_3$—$SiO_2$-type ceramics are not contained, and non-fibrous particulate matter having the same material as any one of the fibrous reinforcements is mixed as an abrasive component.

Preferably, in the above-mentioned friction material according to the present invention, the non-fibrous particulate matter is shot or crushed matter.

It is more preferable that, in the above-mentioned friction material according to the present invention, the particulate matter is subjected to surface treatment with a silane coupling agent, phenol resin, or the like.

Moreover, in the above-mentioned friction material according to the present invention, preferably, the particulate matter is mixed at a ratio in the range of 0.5 wt % to 20 wt % of the whole of the friction material.

It is more preferable that, in the above-mentioned friction material according to the present invention, the particulate matter is mixed at a ratio in a range of from 1 wt % to 15 wt % of the whole of the friction material.

Moreover, in the above-mentioned friction material according to the present invention, preferably, the diameter of the particulate matter is in the range of from 2 μm to 100 μm.

It is more preferable that, in the above-mentioned friction material according to the present invention, the diameter of the particulate matter is in the range of 2 μm to 50 μm.

DETAILED DESCRIPTION OF THE PREFERRED EMBODIMENTS

Figure 1:
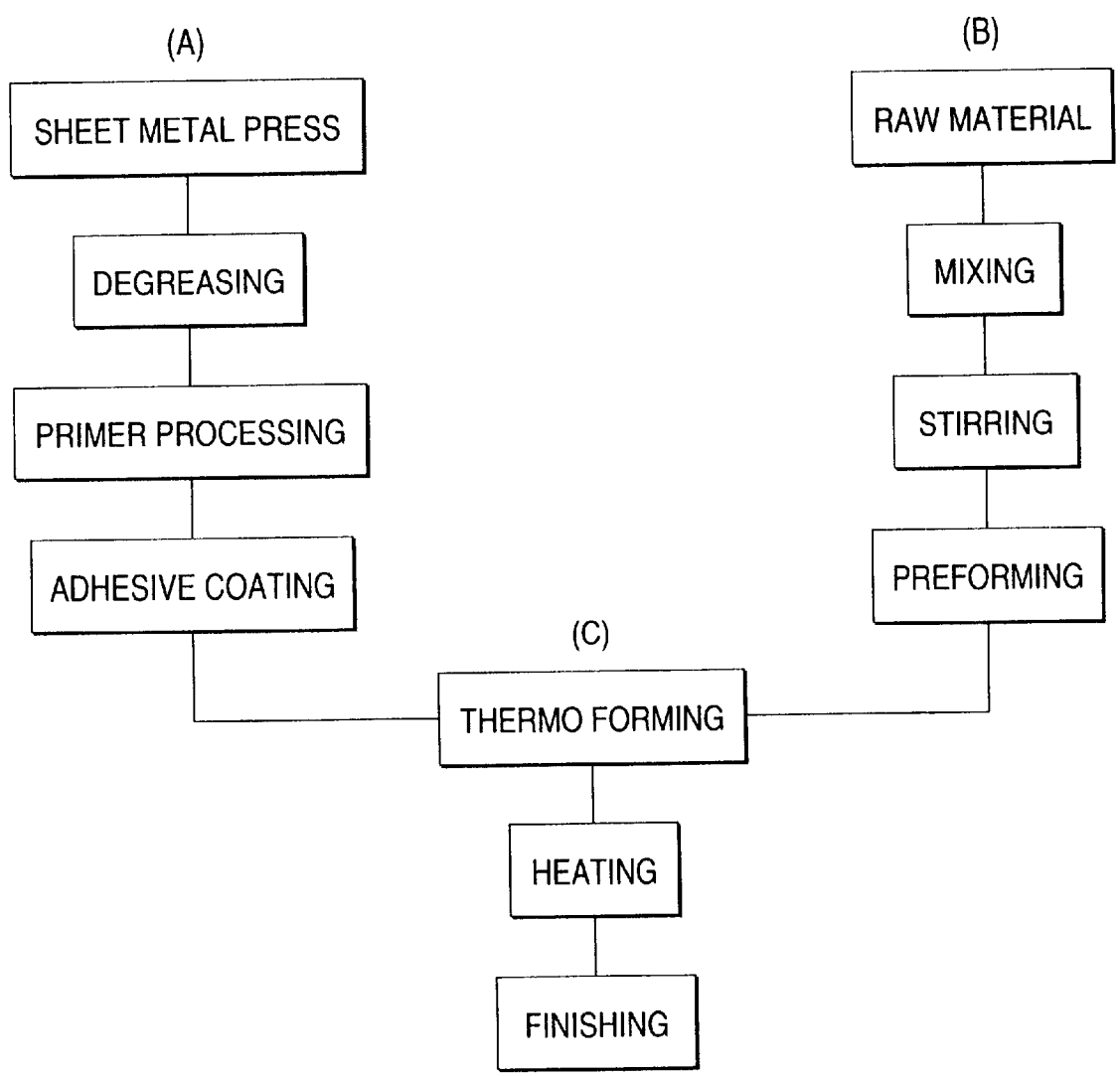
FIG. 1 is a flow sheet showing an example of a process for manufacturing a friction material according to the present invention.

A friction material is composed of a fibrous reinforcement, a friction modifier, a binder, etc. Organic fiber, metal fiber and inorganic fiber are used as the fibrous reinforcements. In the present invention, however, inorganic fiber is not used as one kind of fibrous reinforcement, but non-fibrous particulate matter having the same material as such an inorganic fibrous reinforcement is used in place of the former.

Therefore, non-fibrous particulate matter of rock wool, slag wool and $Al_2O_3$—$SiO_2$-type ceramics, including $Al_2O_3$—$SiO_2$ as a main component, is used preferably. Specific examples of the compositions of the non-fibrous particulate matter include $Al_2O_3$—$SiO_2$—$ZrO_2$-type rock wool or slag wool, both including $Al_2O_3$—$SiO_2$—$ZrO_2$ as a main component, $Al_2O_3$—$SiO_2$—CaO—MgO-type rock wool or slag wool, both including $Al_2O_3$—$SiO_2$—CaO—MgO as a main component, $Al_2O_3$—$SiO_2$-type ceramics, etc.

It is preferable that the particulate matter is used in the form of shot or crushed matter and the diameter is in the range of 2 μm to 100 μm. If the diameter of the particulate matter is small, the rust removing effect is not sufficient. If the diameter of the particulate matter is large, the abrasive effect is so large that a target material to be abraded is damaged too much. Preferably, the diameter of the particulate matter is in the range of 2 μm to 50 μm. The above-mentioned "shot" means a small particulate by-product produced when rock wool or slag wool is produced. Such small particulate matter is produced in great volume, but usually collected and used again as molten material. Such particulate matter can be used in the present invention. Small particulate matter of ceramics other than rock wool and slag wool may be also used as shots if they are of $Al_2O_3$—$SiO_2$-type.

The amount of the particulate matter in a friction material is set to be in the range of 0.5 wt % to 20 wt % of the whole of the friction material. If the amount of the particulate matter is small, the rust removing effect is not sufficient. If the amount is large, the abrasive effect is so large that a target material to be abraded is damaged too much. It is therefore preferable that the loading of the particulate matter is set to be in the range of 1 wt % to 15 wt %.

In addition, it is preferable that the particulate matter is subjected to surface treatment with a silane coupling agent or phenolresin. The particulate matter subjected to such surface treatment has an advantage that it is easily mixed with other materials when a friction material is manufactured, so that the strength of a thermoformed product is increased. The amount of the silane coupling agent or phenol resin to be added is preferably set to be in the range of 0.5 wt % to 5 wt % of the particulate matter.

An inorganic friction modifier such as zirconia, alumina, magnesia, or the like, is usually added to a friction material in the background art. Also in the present invention, such an inorganic friction modifier may be used with the above-mentioned particulate matter. Not to say, an aimed effect can be obtained even if only the above-mentioned particulate matter is used.

To produce a friction material according to the present invention, powdered raw materials of a fibrous reinforcement, a friction modifier, a lubricant and a binder for composing the friction material are mixed, and the mixture is preformed and thermoformed in a normal producing process.

Examples of the fibrous reinforcements include heat-resistant organic fiber such as aromatic polyamide fiber, fire-resistant acrylic fiber, or the like, and metal fiber such as copper fiber, steel fiber, or the like.

Examples of the inorganic fillers include metal particles of copper, aluminum, zinc, or the like, flake minerals such as vermiculite, mica, or the like, and particles of barium sulfate, calcium carbonate, or the like.

Examples of the binders may include thermosetting resin such as phenol resin (including straight phenol resin, and various phenol resin modified with rubber or the like), melamine resin, epoxy resin, polyimide resin, etc.

Examples of the friction modifiers may include inorganic friction modifiers such as alumina, silica, magnesia, zirconia, chrome oxide, quartz, etc. and organic friction modifiers such as synthetic rubber, cashew dust, etc. Examples of lubricants may include graphite, molybdenum disulfide, etc.

The friction material may take a variety of compounding ratios as its composition.

FIG. 1 shows a process for manufacturing a brake pad for a disc brake. A pressure plate is molded into a predetermined form by sheet metal pressing, subjected to degreasing and primer processing, and coated with an adhesive agent. Powdered raw materials of a fibrous reinforcement of heat-resistant organic fiber, metal fiber or the like, organic and inorganic fillers, a friction modifier, and thermosetting resin, and so on, are mixed and sufficiently homogenized by stirring. The raw materials are preformed at room temperature and predetermined pressure so that a preformed friction material is produced. The pressure plate and the preformed friction material are thermoformed at predetermined temperature and pressure in a thermoforming process so as to be fixed integrally with each other. The integrated friction material is after-cured and finally subjected to finishing. This manufacturing process is the same as that in the background art.

The present invention will be described specifically on the basis of its examples. However, the present invention is not limited to only these examples.

Examples

Raw Materials of Friction Material Samples

The following raw materials were used for producing samples of friction materials. In producing the samples, materials were selected from those raw materials and their mixture was changed in every sample.

| | |
|---|---|
| Binder: | phenol resin |
| Organic friction modifier: | cashew dust |
| Filler: | barium sulfate |
| Abrasive (inorganic friction modifier): | zirconia |
| Lubricant: | graphite |
| Reinforcement: | copper fiber/Aramid fiber |
| Reinforcement and abrasive: | fibrous matter of rock wool, slagwool, or $Al_2O_3$—$SiO_2$-type ceramics |
| Reinforcement and abrasive: | potassium titanate fiber |
| Abrasive: | particulate matter of rock wool, slag wool, or $Al_2O_3$—$SiO_2$-type ceramics, having various kinds of diameters |

Compositions of the Friction Material Samples

Compositions having mixture ratios shown in Table 1 were used for producing samples of friction materials. Thus, Samples No. 1 to 12 were made up.

The materials used in the respective samples have the following features.

(1) Sample No. 1 (Comparative): containing 5 wt % of a fibrous reinforcement of $Al_2O_3$—$SiO_2$-type ceramics (2) Sample No. 2 (Comparative): containing neither any fibrous reinforcement nor any particulate matter of the above-mentioned ceramics, rock wool and slag wool (3) Samples No. 3 et seq. (Inventive): containing particulate matter (various kinds of diameters) of any of $Al_2O_3$—$SiO_2$—$ZrO_2$-type rock wool, $Al_2O_3$—$SiO_2$—CaO—MgO-type rock wool, and $Al_2O_3$—$SiO_2$-type ceramics (parts of the samples use particulate matter subjected with silane coupling treatment) (Producing brake pads)

Brake pads having the above-mentioned samples of friction materials were produced by a background-art producing method.

TABLE 1

| Component (wt %) | No. 1 Comparative | No. 2 Comparative | No. 3 Inventive | No. 4 Inventive | No. 5 Inventive | No. 6 Inventive |
|---|---|---|---|---|---|---|
| binder resin | 10 | 10 | 10 | 10 | 10 | 10 |
| cashew dust | 10 | 10 | 10 | 10 | 10 | 10 |
| barium sulfate | 45 | 50 | 45 | 40 | 45 | 45 |
| zirconium oxide | 2 | 2 | 2 | 2 | 2 | 2 |
| graphite | 8 | 8 | 8 | 8 | 8 | 8 |
| copper fiber/Aramid fiber | 10/5 | 10/5 | 10/5 | 10/5 | 10/5 | 10/5 |
| ceramics fiber ($Al_2O_3$—$SiO_2$-type) | 5 | — | — | — | — | — |
| potassium titanate fiber | 5 | 5 | 5 | 5 | 5 | 5 |
| shot of $Al_2O_3$—$SiO_2$—$ZrO_2$-type rock wool 10 μm | — | — | 5 | 10 | — | — |
| shot of $Al_2O_3$—$SiO_2$—$ZrO_2$-type rock wool 50 μm | — | — | — | — | 5 | — |
| shot of $Al_2O_3$—$SiO_2$—$ZrO_2$-type rock wool 100 μm | — | — | — | — | — | 5 |
| shot of $Al_2O_3$—$SiO_2$—$ZrO_2$-type rock wool (processed with silane coupling) 10 μm | — | — | — | — | — | — |
| shot of $Al_2O_3$—$SiO_2$—CaO—MgO-type rock wool (processed with silane coupling) 10 μm | — | — | — | — | — | — |
| shot of $Al_2O_3$—$SiO_2$-type-type ceramics (processed with silane coupling) 10 μm | — | — | — | — | — | — |
| crushed matter of $Al_2O_3$—$SiO_2$—$ZrO_2$-type 10 μm | — | — | — | — | — | — |
| shot of $SiO_2$—CaO—MgO—$ZrO_2$ rock wool-type 10 μm | — | — | — | — | — | — |

| Component (wt %) | No. 7 Inventive | No. 8 Inventive | No. 9 Inventive | No. 10 Inventive | No. 11 Inventive | No. 12 Inventive |
|---|---|---|---|---|---|---|
| binder resin | 10 | 10 | 10 | 10 | 10 | 10 |
| cashew dust | 10 | 10 | 10 | 10 | 10 | 10 |
| barium sulfate | 45 | 45 | 45 | 40 | 45 | 45 |
| zirconium oxide | 2 | 2 | 2 | 2 | 2 | 2 |
| graphite | 8 | 8 | 8 | 8 | 8 | 8 |
| copper fiber/Aramid fiber | 10/5 | 10/5 | 10/5 | 10/5 | 10/5 | 10/5 |
| ceramics fiber ($Al_2O_3$—$SiO_2$-type) | — | — | — | — | — | — |
| potassium titanate fiber | 5 | 5 | 5 | 5 | 5 | 5 |
| shot of $Al_2O_3$—$SiO_2$—$ZrO_2$-type rock wool 10 μm | — | — | — | — | — | — |
| shot of $Al_2O_3$—$SiO_2$—$ZrO_2$-type rock wool 50 μm | — | — | — | — | — | — |
| shot of $Al_2O_3$—$SiO_2$—$ZrO_2$-type rock wool 100 μm | — | — | — | — | — | — |
| shot of $Al_2O_3$—$SiO_2$—$ZrO_2$-type rock wool (processed with silane coupling) 10 μm | 5 | — | — | 10 | — | — |
| shot of $Al_2O_3$—$SiO_2$—CaO—MgO-type rock wool (processed with silane coupling) 10 μm | — | 5 | — | — | — | — |
| shot of $Al_2O_3$—$SiO_2$-type ceramics (processed with silane coupling) 10 μm | — | — | 5 | — | — | — |
| crushed matter of $Al_2O_3$—$SiO_2$—$ZrO_2$-type 10 μm | — | — | — | — | 5 | — |
| shot of $SiO_2$—CaO—MgO—$ZrO_2$-type rock wool 10 μm | — | — | — | — | — | 5 |

Examination Method

The following examinations were performed upon a disc brake using a rotor.

(1) JASO effect evaluation

JASO effect evaluation was made on the conditions of an initial speed of 50 km/h, an initial speed of 100 km/h, and a deceleration $\alpha=5.88$ m/s$^2$.

(2) Rust removing ratio

A rotor with rust about 50 μm thick was rubbed with a friction material, and the rust removing ratio was measured after the performance of N=200.

The friction material is regarded as passing if it has a rust removing ratio of 80% or more.

Examination Results

The results of the examinations are shown in Table 2.

TABLE 2

|  |  | No. 1 Comparative | No. 2 Comparative | No. 3 Inventive | No. 4 Inventive | No. 5 Inventive | No. 6 Inventive |
|---|---|---|---|---|---|---|---|
| JASO Effect | Initial Speed 50 km/h | 0.45 | 0.38 | 0.43 | 0.48 | 0.47 | 0.50 |
|  | Initial Speed 100 km/h | 0.40 | 0.30 | 0.38 | 0.45 | 0.43 | 0.45 |
| Rust Removing Ratio |  | 100 | 50 | 100 | 100 | 100 | 100 |
|  |  | No. 7 Inventive | No. 8 Inventive | No. 9 Inventive | No. 10 Inventive | No. 11 Inventive | No. 12 Inventive |
| JASO Effect | Initial Speed 50 km/h | 0.42 | 0.43 | 0.48 | 0.46 | 0.43 | 0.42 |
|  | Initial Speed 100 km/h | 0.38 | 0.39 | 0.42 | 0.41 | 0.38 | 0.39 |
| Rust Removing Ratio |  | 100 | 100 | 100 | 100 | 100 | 100 |

Most of Samples No. 3 to No. 12 according to the present invention could obtain a good result as the JASO effect at the initial speed 50 km/h in comparison with Samples No. 1 and No. 2 of Comparative examples. In addition, most of the Inventive Samples No. 3 to No. 12 could obtain a good result also at the initial speed 100 km/h in comparison with the Comparative Samples No. 1 and No. 2.

In each of the Inventive Samples No. 3 to No. 12, the rust removing ratio was 100%, and a sufficient effect could be obtained. In the Comparative Sample No. 2 in which neither any particular matter nor any fibrous reinforcement of rock wool, slag wool and Al$_2$O$_3$—SiO$_2$-type ceramics was applied, the rust removing ratio was 50% to be poor.

According to the present invention, particulate matter having the same composition as that of a fibrous reinforcement of rock wool, slag wool or Al$_2$O$_3$—SiO$_2$-type ceramics is used so that it is possible to obtain effects similar to those in the case where such a fibrous reinforcement is used. It is therefore possible to avoid a problem arisen when such a fibrous reinforcement is used. Nevertheless, it is possible to obtain a sufficient friction effect.

While only certain embodiments of the invention have been specifically described herein, it will be apparent that numerous modifications may be made thereto without departing from the spirit and scope of the invention.

The present invention is based on Japanese Patent Application No. Hei. 11-99098 which is incorporated herein by reference.

What is claimed is:

1. A friction material comprising:

a fibrous reinforcement;

a friction modifier;

a binder; and an abrasive component;

wherein said abrasive component includes non-fibrous particulate matters having a constituent the same as at least one of rock wool, slag wool, and ceramics, each of which includes Al$_2$O$_3$—SiO$_2$ as a main component, and does not include fibrous matters of rock wool, slag wool, and ceramics, each of which includes Al$_2$O$_3$—SiO$_2$ as a main component; and wherein said non-fibrous particulate matter is one of shot and crushed matter.

2. The friction material according to claim 1, wherein the non-fibrous particulate matter of said abrasive component is subjected to surface treatment with one of a silane coupling agent and phenol resin.

3. The friction material according to claim 2, wherein an amount of one of the silane coupling agent and phenol resin to be added is in the range of 0.5 wt % to 5 wt % of the particulate matter.

4. The friction material according to claim 1, wherein the non-fibrous particulate matter of said abrasive component is mixed at a ratio in the range of 0.5 wt % to 20 wt % of the whole of the friction material.

5. The friction material according to claim 1, wherein the non-fibrous particulate matter of said abrasive component is mixed at a ratio in the range of 1 wt % to 15 wt % of the whole of the friction material.

6. The friction material according to claim 1, wherein the diameter of the non-fibrous particulate matter is in the range of 2 μm to 100 μm.

7. The friction material according to claim 1, wherein the diameter of the non-fibrous particulate matter is in the range of 2 μm to 50 μm.

* * * * *